Sept. 29, 1942.　　　　　　R. POLL　　　　　　2,297,431
FARE INDICATOR
Filed April 2, 1940　　　　2 Sheets-Sheet 1

Inventor:
Rudolf Poll;
by Harold E. Penner;
Attorney:

Sept. 29, 1942.  R. POLL  2,297,431
FARE INDICATOR
Filed April 2, 1940  2 Sheets-Sheet 2
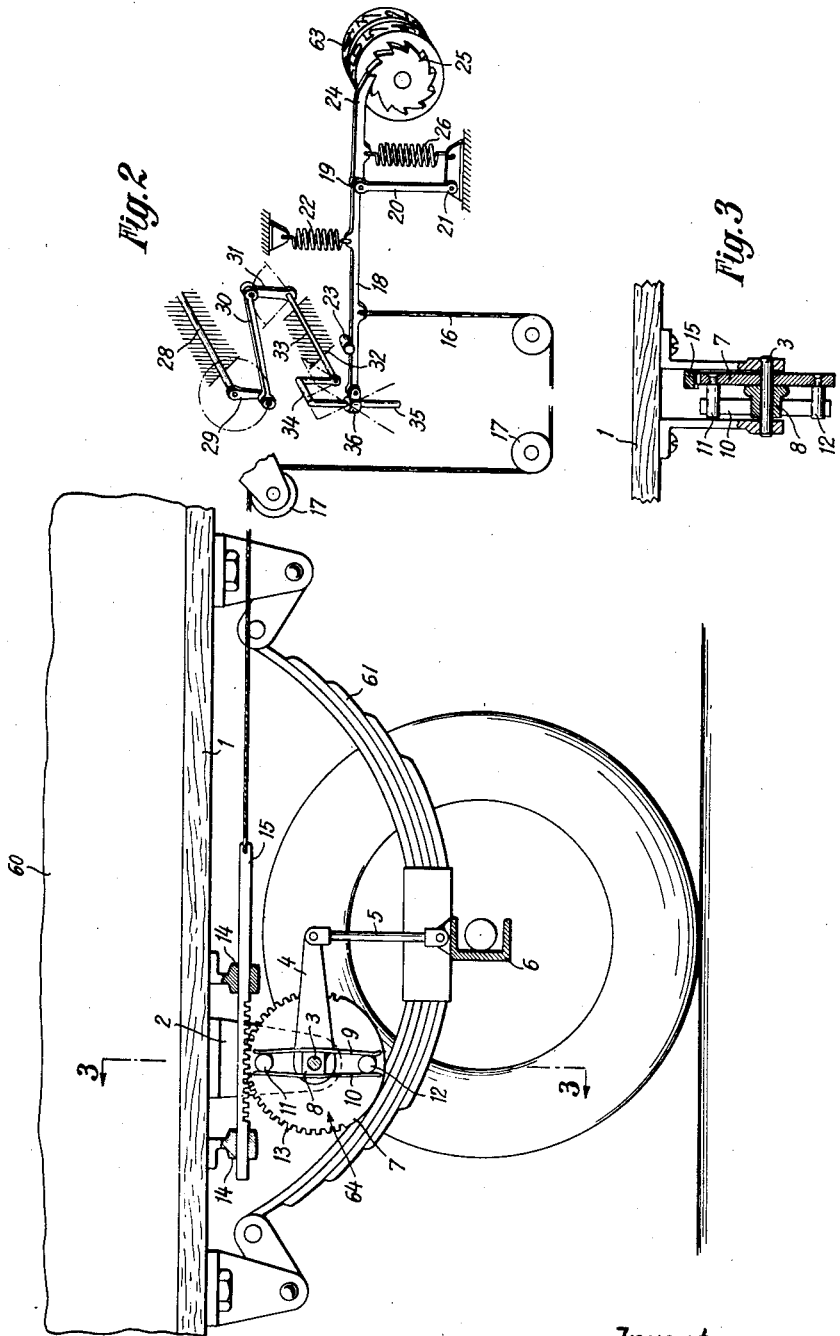
Inventor:
Rudolf Poll;
by Harold D. Penney,
Attorney:

Patented Sept. 29, 1942

2,297,431

UNITED STATES PATENT OFFICE 2,297,431

FARE INDICATOR

Rudolf Poll, Gaggenau, Baden, Germany, vested in the Alien Property Custodian

Application April 2, 1940, Serial No. 327,492
In Germany July 2, 1937

2 Claims. (Cl. 235—30)

My invention relates to improvements in fare indicators and more particularly in fare indicators of the type which do not indicate only the length of way, but also the load of the vehicle, the said indications made by the indicator being the product of the length of way by the load carried by the vehicle. In such indicators the indicating mechanism is controlled by the displacement of the body of the vehicle relatively to one of the axles thereof, the said displacement being proportional to the load by reason of the compression of the springs supporting the body on the axle. One of the objects of the improvements is to provide a fare indicator of this type in which the oscillations of the body of the car caused by uneven roads are not transmitted to the indicating mechanism, and with this object in view the invention consists in providing a damping device in the mechanism transmitting the displacement of the body of the vehicle to the indicating mechanism, the said damping device being constructed so that a displacement lasting a certain length of time is transmitted to the indicating mechanism, while the oscillations of the body caused by the wheels running on uneven roads are not transmitted.

My invention also relates to various details of construction which will be explained hereinafter and particularly pointed out in the appended claims.

Figure 1:
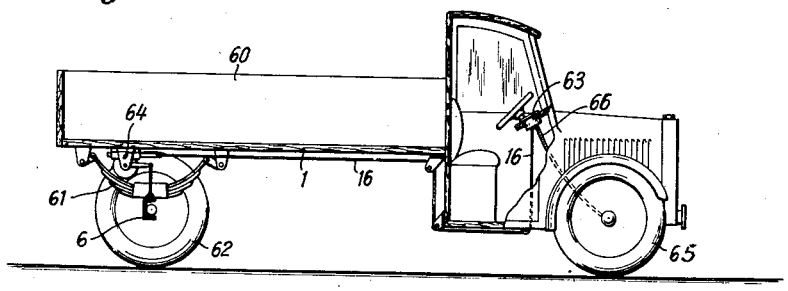
Figure 4:
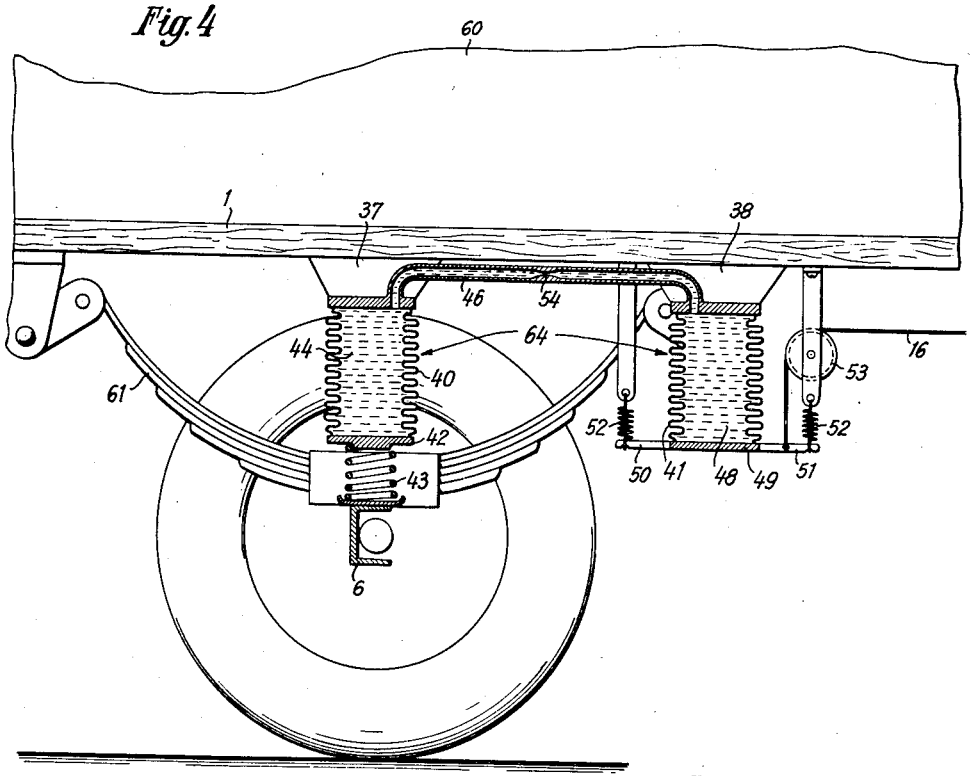

For the purpose of explaining the invention two examples embodying the same have been shown in the accompanying drawings in which the same reference characters have been used in all the views to indicate corresponding parts. In said drawings, Fig. 1 is a diagrammatical sectional elevation showing a vehicle having the fare indicator mounted thereon, Fig. 2 is a diagrammatical elevation partly in section and partly in perspective view showing a ratchet disk forming the driving member of the indicating instrument, the mechanism controlled by the rotation of one of the wheels of the vehicle for transmitting the length of way to the said ratchet disk, and a device dependent upon the displacement of the body of the vehicle relatively to the axle thereof and connected with the said mechanism, Fig. 3 is a sectional elevation taken on the line 3—3 of Fig. 2 and showing a detail, and Fig. 4 is a diagrammatical sectional elevation showing a modification of the damping mechanism.

The body 60 of the vehicle is supported by means of springs 61 on a transverse member 6 on which the wheels 62 are mounted. On the said body fare indicating mechanism is mounted at 63 near the steering wheel and below the frame 1 of the body damping mechanism 64 is mounted.

Referring now to Fig. 2, the fare indicator comprises a driving member in the form of a ratchet disk 25 which is engaged by a pawl 24 acted upon by a spring 26. The said pawl is jointed at 19 to a link 20 pivotally mounted on the body of the vehicle at 21. To the pivot bolt 19 a link 18 is jointed which is acted upon by a spring 22 tending to hold the same in engagement with a relatively fixed bolt 23. On the other end of the link 18 a sleeve 36 is pivotally mounted which slides on a slide rod 35 depending from a crank 34 of a rock shaft 33 mounted in a bearing 32. A crank arm 31 of the said rock shaft is connected by a link 30 with a crank arm 29 of a shaft 28 adapted to be rotated by a wheel 65 of the vehicle. The operative connection between the said wheel and the shaft 28 may consist of a flexible shaft 66.

Normally the link 18 is held by the spring 22 in contact with the bolt 23, in which position the sleeve 36 is located coaxially of the shaft 33. But it is adapted to be pulled downwardly in opposition to the spring 22 by a rope 16 trained on pulleys such as 17 and connected with a device controlled by the displacement of the body 60 of the vehicle under the load thereof.

In the example shown in Fig. 2 the said mechanism is constructed as follows: On a pair of brackets 2 depending from the frame 1 of the body 60 a shaft 3 is rockingly mounted to which a lever 4 is secured. The said lever is connected by a link 5 with the transverse member 6 supported on the wheel 62. On the shaft 3 a weighted body 7 is rotatably mounted which is formed about a part of its circumference with gear teeth 13 meshing with the teeth of a rack 15 guided in bearings 14 depending from the frame 1. To the weighted body 7 pins 11 and 12 are secured which are engaged by a pair of leaf springs 9 and 10 secured to a block 8 connected with the lever 4. To the rack 15 the rope 16 is secured.

The operation of the indicator is as follows: By the rotation of the wheel 65 the shaft 28 is rotated through the intermediary of the shaft 66, and by means of the crank 29, the link 30 and the crank arm 31 rocking movement is imparted to the shaft 33 and the rod 35 carried thereby. In Fig. 2 the rotary movement of the shaft 28 and the rocking movement of the crank arm 31 and the rod 35 have been indicated in dotted lines. While the sleeve 36 is in the position shown in Fig. 2 and in axial alignment with the shaft 33 such rocking movement of the shaft 33 is not transmitted to the link 18, and therefore no movement is transmitted by the pawl 24 to the ratchet disk 25. The link 18 is in this position when the vehicle is unloaded. If however the vehicle is loaded the spring 62 is bent downwardly, and by the displacement of the body 60 the lever 4 is turned anticlockwise, and such anticlockwise movement is transmitted through the leaf springs 9 and 10 to the weighted body 7, the rack 15 and the rope 16, which pulls the link 18 and the sleeve 36 downwardly. Now the rocking movement of the shaft 33 causes reciprocating movement of the link 18 and the pawl 24 so that the ratchet disk 25 is advanced, the degree of the rotary movement of the ratchet disk being the product of the length of way of the vehicle by the load thereof.

When the vehicle drives on uneven roads the oscillations of the body 60 are transmitted through the link 5 to the lever 4, and if the said link is rigidly connected with the body 7, any oscillation will cause displacement of the sleeve 36 on the rod 35, so that the indications of the fare indicator are incorrect. Therefore, in my improved construction the body 7 is made with a considerable mass, and the lever 4 acts on the said mass through the leaf springs 9 and 10. If now short impulses are transmitted by the link 5 to the lever 4, such impulses are not transmitted to a considerable extent to the body 7, but they are taken up by the springs 9 and 10. Therefore these short impulses have no influence on the position of the link 18 and the indication of the fare indicator. But the displacement of the body 60 of the vehicle by the load thereof is transmitted through the springs 9 and 10 which gradually turn the weighted body 7 anticlockwise.

In the modification shown in Fig. 4 the damping device acts by means of a body of liquid flowing through an orifice of reduced area and adapted to set the link 18 for varying the gear ratio of the mechanism for transmitting the movement from the wheel 65 to the ratchet disk 25. As shown, the damping device consists of two containers 44 and 48 fixed to brackets 37 and 38 secured to the bottom side of the frame 1 of the body 60 of the vehicle. The said containers have elastic walls 40 and 41 permitting the same to be expanded and contracted. The bottom 42 of the container 44 is supported on the transverse member 6 through the intermediary of a spring 43 urging the said bottom 42 upwardly for compressing the container 44. To the bottom 49 of the container 48 arms 50 and 51 are secured which are acted upon by springs 52, 52 urging the bottom 49 upwardly. To the arm 51 the rope 16 is attached, which as shown is guided on a roller 53 and the rollers 17 shown in Fig. 1, and which is connected to the link 18 in the manner described with reference to Fig. 1.

The containers 44 and 48 communicate with each other through a pipe 46 having an orifice 54 of reduced cross-sectional area. By the load of the vehicle the body 60 bearing on the usual vehicle springs 61 is displaced downwardly proportionally to the load, and by the said displacement the spring 43 is compressed. Thus the bottom 42 is forced upwardly and the liquid is partly expelled from the container 44 and into the container 48, and it is gradually transmitted thereto through the orifice 54 of reduced area, until equilibrium is reestablished. Thus the container 48 is expanded, and the displacement of the bottom 49 is transmitted through the rope 16 to the link 18 of the fare indicator shown in Fig. 2. If the vehicle drives on uneven roads the jars exerted on the wheels are transmitted to the bottom 42 of the container 44 through the spring 43 which is compressed accordingly. However, by reason of the orifice 54 the liquid from the receptacle 44 is not practically transmitted to the container 48, so that the said jars are taken up by the spring 43 and have no action on the indications of the fare indicator.

In the vehicle the fare indicating mechanism comprising the ratchet disk 25 and the shafts 28 and 33 is preferably located near the seat of the driver, while the damping device is mounted on the body of the vehicle near one of the wheels, as is common in the art. However, I do not limit myself to this construction. For example the container 48 may be located near the seat of the driver in which case a comparatively long pipe 46 and a short rope 16 is provided.

I claim:

1. In combination, a vehicle having a body, an axle, and springs supporting the body on the axle and adapted, as long as a load is in the body, to yield to lower the body substantially proportionally to the weight of the load; the force due to said load on said axle being an axle load; an indicator; a drive means driven by the road wheels for driving the indicator; and ratio-changing means connected between the axle and body for changing the driving ratio of the driving means substantially proportionally to said axle load; whereby the indicator indicates substantially a function of the product of the distance of travel and the axle load, and indicates a greater amount for the same distance if the load is greater.

2. In a combination as in claim 1, a damping device interposed in the ratio changing means for preventing the sudden changes of the position of said body relative to the axle from substantially changing the driving ratio.

RUDOLF POLL.